US006918401B1

(12) United States Patent
Vanderveen et al.

(10) Patent No.: US 6,918,401 B1
(45) Date of Patent: Jul. 19, 2005

(54) THROTTLE SHAFT ASSEMBLY AND METHOD OF ATTACHMENT

(75) Inventors: James K. Vanderveen, Blenheim; Dan Pannunzio, Kingsville, both of (CA)

(73) Assignee: Siemens Canada Limited, Tilbury (CA)

( * ) Notice: Subject to any disclaimer, the term of this patent is extended or adjusted under 35 U.S.C. 154(b) by 1082 days.

(21) Appl. No.: 09/649,303

(22) Filed: Aug. 28, 2000

Related U.S. Application Data

(60) Provisional application No. 60/152,793, filed on Sep. 8, 1999.

(51) Int. Cl.[7] .................................................. F16K 1/22

(52) U.S. Cl. ..................................... 137/15.25; 251/308

(58) Field of Search .......................... 251/66, 263, 294, 251/305, 308, 313, 337; 137/15.25

(56) References Cited

U.S. PATENT DOCUMENTS 5,666,988 A * 9/1997 Becker .................... 137/15.18
5,996,551 A * 12/1999 Schroder .................... 123/337
6,167,867 B1 * 1/2001 Garrick ...................... 123/400
6,263,898 B1 * 7/2001 Vanderveen et al. ..... 137/15.25

* cited by examiner

*Primary Examiner*—Kevin Shaver
*Assistant Examiner*—Patrick Buechner

(57) ABSTRACT

A method and apparatus is provided for the attachment of a throttle shaft to a throttle body. A throttle shaft, a spring, and a cap retainer, are temporarily assembled as a throttle shaft subassembly. A set of locking members extend from the cap retainer to engage a set of locking surfaces adjacent the throttle shaft to retain the spring in tension. The cap retainer fits onto a boss extending from the throttle body and is lockable thereto by a set of fingers which are received into engagement recesses located on the boss. As the shaft subassembly is guided into the throttle body, the cap retainer is rotated by the engagement surfaces and the locking members are disengaged from the locking surfaces to at least partially unload the spring to mount the shaft.

19 Claims, 4 Drawing Sheets

THROTTLE SHAFT ASSEMBLY AND METHOD OF ATTACHMENT

RELATED APPLICATION

This application claims priority to provisional application No. 60/152,793 filed on Sep. 8, 1999.

BACKGROUND OF THE INVENTION

This invention relates to a method and apparatus for attaching a throttle shaft to a throttle body.

Throttle valves typically include a throttle blade or disc attached to a throttle shaft, which extends across a bore formed in a throttle body. The throttle blade rotates within the bore to control air flow from an intake manifold to a vehicle engine.

The assembly of the throttle shaft into the throttle body is a time consuming and labor intensive process. To assure effective operation, the throttle disc and shaft must be properly located with respect to the throttle bore. The shaft return spring must be also be correctly located to provide an effective return force that consistently returns the disc to an idle position.

In one known method a removable alignment device temporarily attaches the spring to the shaft to maintain the spring in the correct position. After assembly, the alignment device is broken away from the throttle assembly such that the spring unwinds and provides the return force for the shaft.

Although, effective, one disadvantage with the known assembly process is that multiple operations are required, typically necessitating the usage of two free hands. This increases assembly time and cost. Thus, it is desirable to provide an attachment method and apparatus that decreases assembly time and cost, and which assures components are correctly aligned to improve quality characteristics.

SUMMARY OF THE INVENTION

The present invention provides a simplified attachment of a throttle shaft assembly to a throttle body.

A throttle assembly includes a throttle body having an airflow passage defining a longitudinal axis. A bore is formed within the throttle body that intersects the airflow passage and defines an axis of rotation along which a throttle shaft and disc rotate to control air flow from an intake manifold to a vehicle engine.

In a disclosed embodiment of this invention, a throttle shaft, a spring, and a cap retainer, are temporarily assembled as a throttle shaft subassembly. By temporarily assembling the components as a subassembly, a shaft attachment method according to the present invention provides decreased assembly time and cost, while eliminating components and improving quality characteristics.

The cap retainer is preferably a cup shaped member which fits onto a boss extending from the throttle body and is lockable thereto by a set of fingers which are received into engagement recesses located on the boss. A set of cap ramped surfaces extend from the cap retainer to engage a set of shaft ramped surfaces to retain the spring in tension.

The method of assembling the shaft subassembly to the throttle body includes inserting the shaft along the shaft axis of rotation. As the shaft subassembly is guided into the throttle assembly, the cap retainer is rotated by the engagement surfaces such that the cap ramped surfaces are disengaged from the shaft ramped surfaces to at least partially unload the spring to preferably mount the shaft in an idle position. During operation, when the shaft is rotated about the axis of rotation away from idle position to a more opened position, the shaft ramped surfaces are rotated further away from the cap ramped surfaces. Accordingly, the cap ramped surfaces and the shaft ramped surfaces do not interfere with normal throttle operation.

These and other features of the present invention can be best understood from the following specification and drawings, the following of which is a brief description.

DETAILED DESCRIPTION OF AN EXEMPLARY EMBODIMENT

Figure 1:
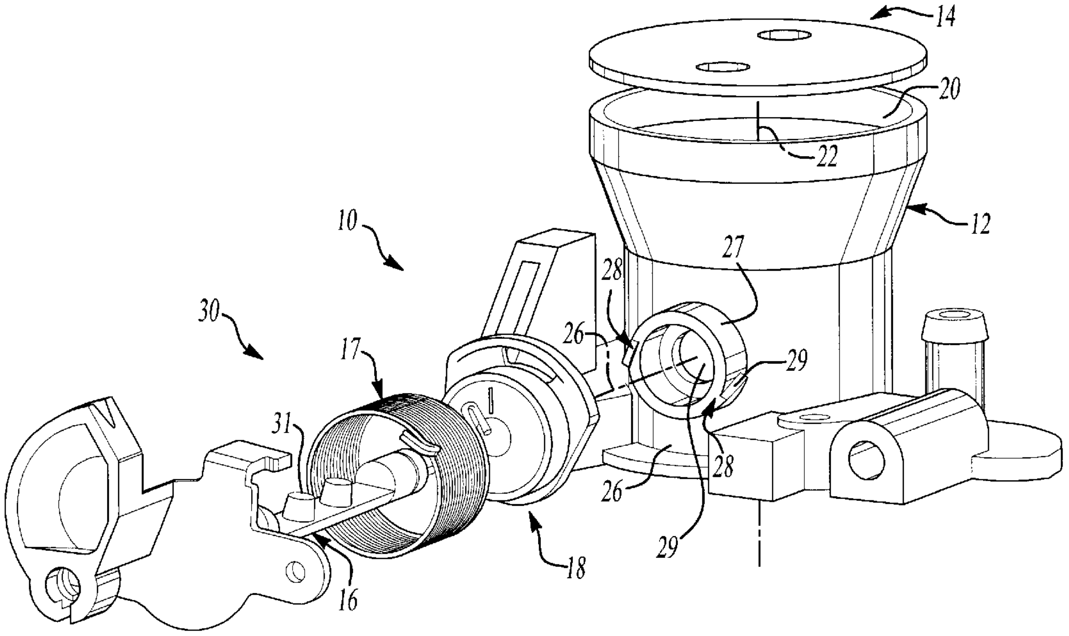
FIG. 1 is an exploded perspective view of a throttle assembly including the subject invention.

A throttle assembly 10, shown in FIG. 1, includes a throttle body 12, a throttle disc or blade 14, a throttle shaft 16, a spring 17 and a cap retainer 18. Throttle body 12 has an airflow passage 20 that defines a longitudinal axis 22. The throttle disc 14 is attached to the shaft 16 and rotates within the passage 20 to control air flow from an intake manifold to a vehicle engine (not shown).

The body 12 includes a transversely extending bore 24 that intersects the airflow passage 20. The bore 24 defines an axis of rotation 26 that is transverse to the longitudinal axis 22. A boss 27 having a set of engagement recesses 28, preferably surrounds bore 24. The engagement recesses 28 preferably include a ramped or dovetail-like angled surface 29.

When assembled, the shaft 16 is located through bore 24 and journaled on the throttle body 12 such that the cap retainer 18 fixedly engages the engagement recesses 28 to mount the shaft 16 within the passage 20. The disc 14 is mounted on the shaft 16 at a notch 31 by fasteners or the like. The disc 14 is mounted for rotation with the throttle shaft 16 about the axis of rotation 26 and is positioned within the throttle body 12 at an intersection between the passage 20 and the bore 24 to control airflow through the passage 20.

Preferably, the shaft 16, spring 17, and cap retainer 18, are temporarily assembled as a shaft subassembly 30 according to the present invention. By temporarily assembling the components as a subassembly, a shaft attachment method according to the present invention provides decreased assembly time and cost, while improving quality characteristics.

Figure 2:
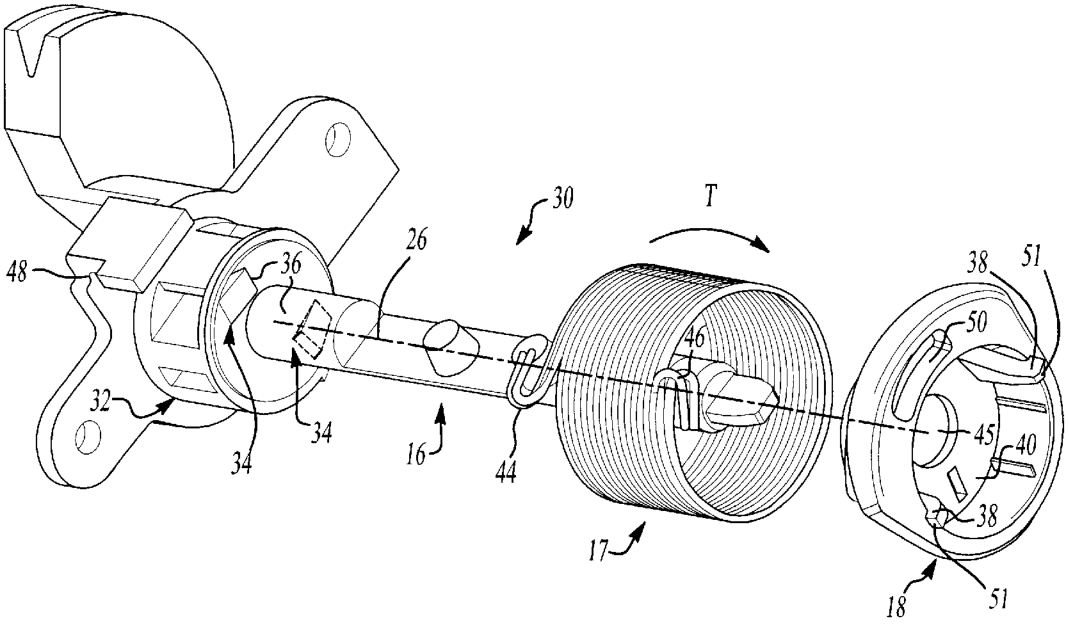
FIG. 2 is an exploded view of a throttle shaft subassembly.
Figure 3:
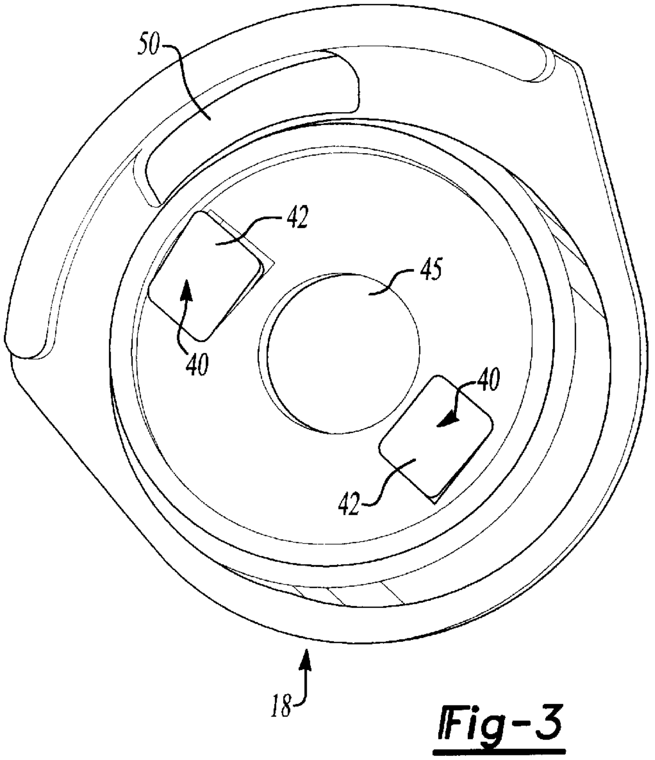
FIG. 3 is an expanded view of a cap retainer according to the present invention.

Referring to FIG. 2, the throttle shaft 16 includes a body portion 32 for receiving rotational input from a linkage or the like (not shown) to move between an idle position and various operable positions to control airflow through the passage 20 (FIG. 1). A set of shaft ramped surfaces 34 extend from the body portion 32 to provide a shaft lock lip 36 (also shown in FIG. 3).

The cap retainer 18 is preferably a cup shaped member which fits onto the boss 26 and is lockable thereto by a set of fingers 38 which are received into engagement recesses 28 (FIG. 1). A set of cap ramped surfaces 40 extend from the cap retainer 18 to provide a cap lock lip 42 (FIG. 3) which are engageable with the shaft lock lips 36. The fingers 38 preferably extend outwardly from the cap retainer 18 opposite the cap ramped surfaces 40.

The spring 17 includes a shaft attachment 44 and a cap retainer attachment 46. Shaft attachment 44 is attachable to a shaft mount 48 while cap retainer attachment 46 is receivable within a spring slot 50 in the cap retainer 18. To assemble shaft subassembly 30, cap retainer attachment 46 is attached within spring slot 50 and the spring 17 and cap retainer 18 are fitted over shaft 16 through aperture 45. Shaft attachment 44 is attached to the shaft mount 48 and the cap retainer 18 is rotated such that the spring is in tension (illustrated by arrow T, FIG. 2). Cap lock lip 42 is then engaged with shaft lock lip 36 (FIG. 4) to complete the shaft subassembly 30.

Figure 4:
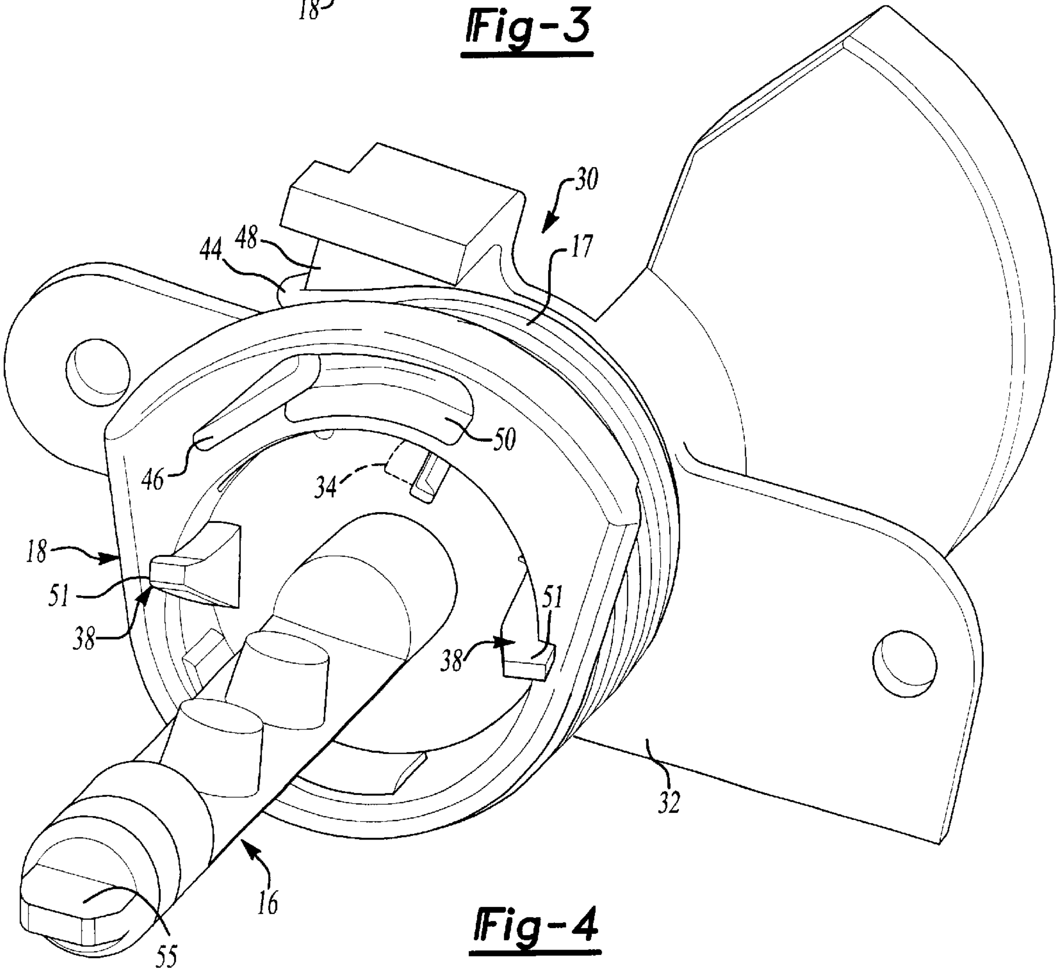
FIG. 4 is a perspective view of the throttle shaft subassembly of FIG. 2 in an assembled condition.

FIG. 4 illustrates the assembled shaft subassembly 30. The spring 17 is maintained in tension as the cap lock lip 42 is engaged with the shaft lock lip 36. The shaft subassembly 30 can now be assembled into the throttle body 12. Preferably, fingers 38 include lock hooks 51 which are fixedly received within the engagement recesses 28.

Figure 5A:
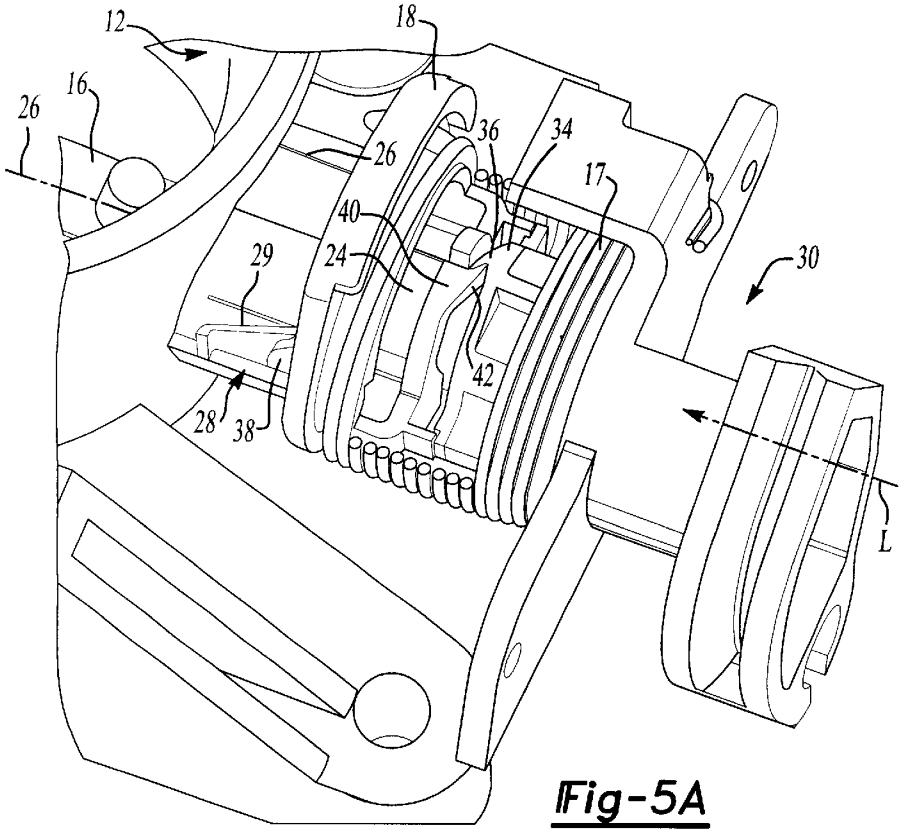
FIG. 5A is a partially assembled view, partially cut-away, of the throttle shaft subassembly during assembly into the throttle body.

The method of assembling the shaft subassembly 30 to the throttle body 12 includes the following steps. Referring to FIG. 5A, the shaft subassembly 30 is assembled with a linear force (illustrated as arrow L) along axis of rotation 26. The throttle shaft 16 is assembled into the bore 24 such that the cap retainer 18 is mounted onto the boss 27. As the throttle shaft 16 is assembled into the bore 24, the fingers 38 are guided into engagement recesses 28.

Figure 5B:
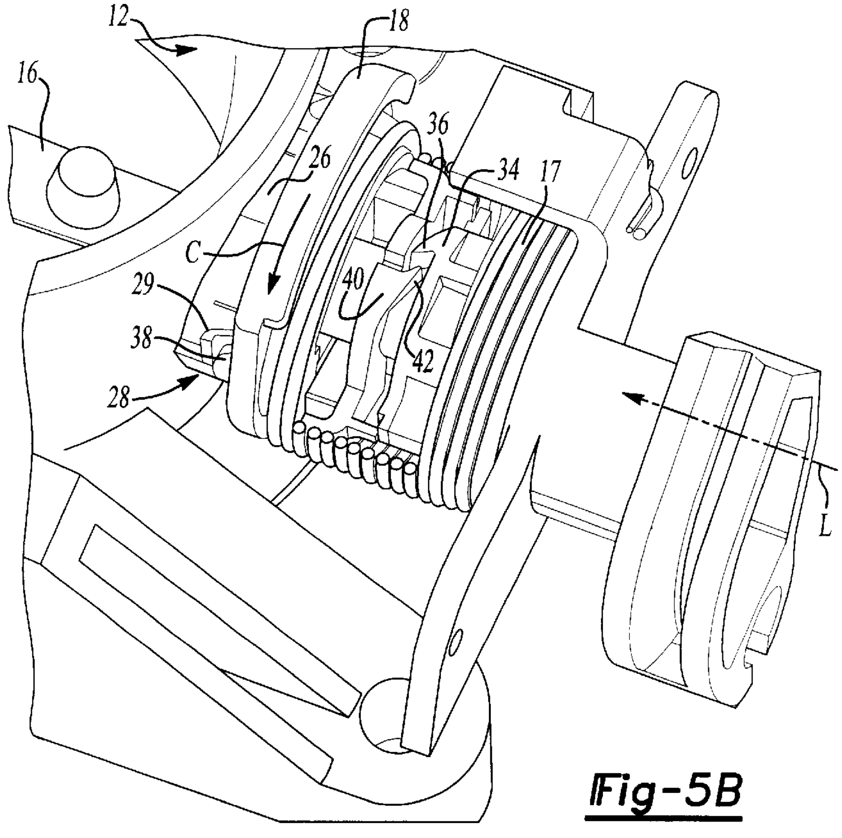
FIG. 5B is a partially assembled view, partially cut-away, of the throttle shaft subassembly of FIG. 5A during further assembly into the throttle body.

Referring to FIG. 5B, as the shaft subassembly 30 is guided in the direction of linear force L, the fingers 38 interact with the engagement recesses 28 to rotate the cap retainer 18 in the direction of arrow C. As the cap retainer 18 is rotated in the direction of arrow C, the cap lock lip 42 is disengaged from the shaft lock lip 36 and the spring 17 becomes at least partially unloaded from it previously tensioned state.

Figure 5C:
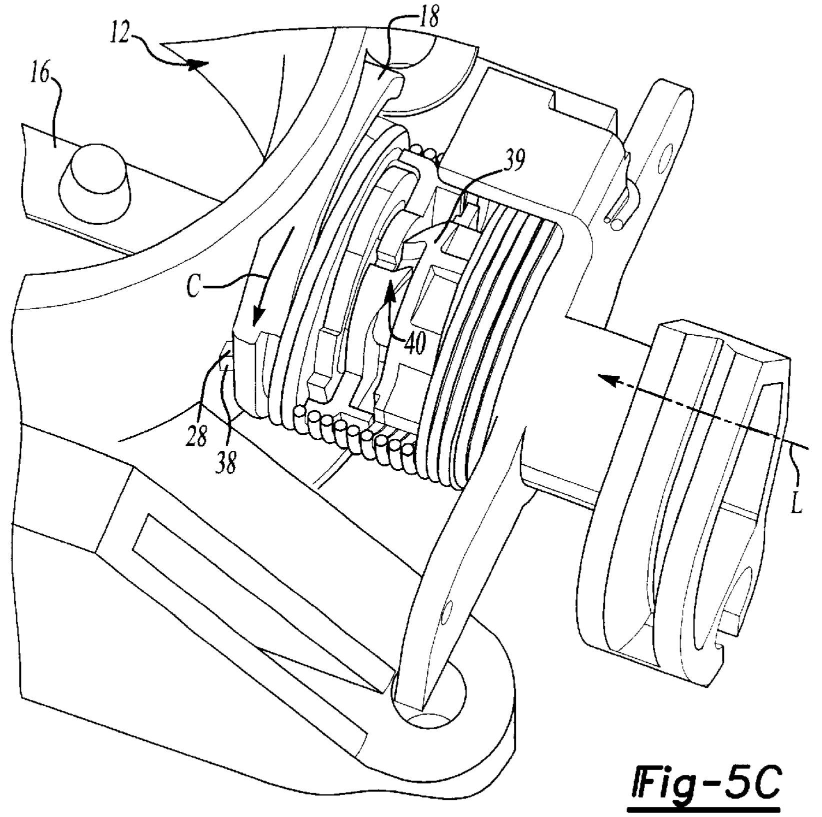
FIG. 5C is an assembled view, partially cut-away, of the throttle shaft subassembly of FIG. 5B assembled into the throttle body.

Referring to FIG. 5C, the shaft subassembly 30 is guided further in the direction of linear force L. The fingers 38 continue to interact with the engagement recesses 28 and the cap retainer 18 is further rotated in the direction of arrow C until lock hooks 51 (FIG. 4) fixedly lock into the engagement recesses 28. At this point the shaft subassembly 30 is mounted to the throttle body 12, the cap lock lip 42 is disengaged from the shaft lock lip 36 and the cap retainer 18 is fixedly mounted to the throttle body 12. Typically, an opposite end 55 (FIG. 4) of the shaft 16 will be retained on the opposite side of the body 12 in a known manner.

Figure 6:
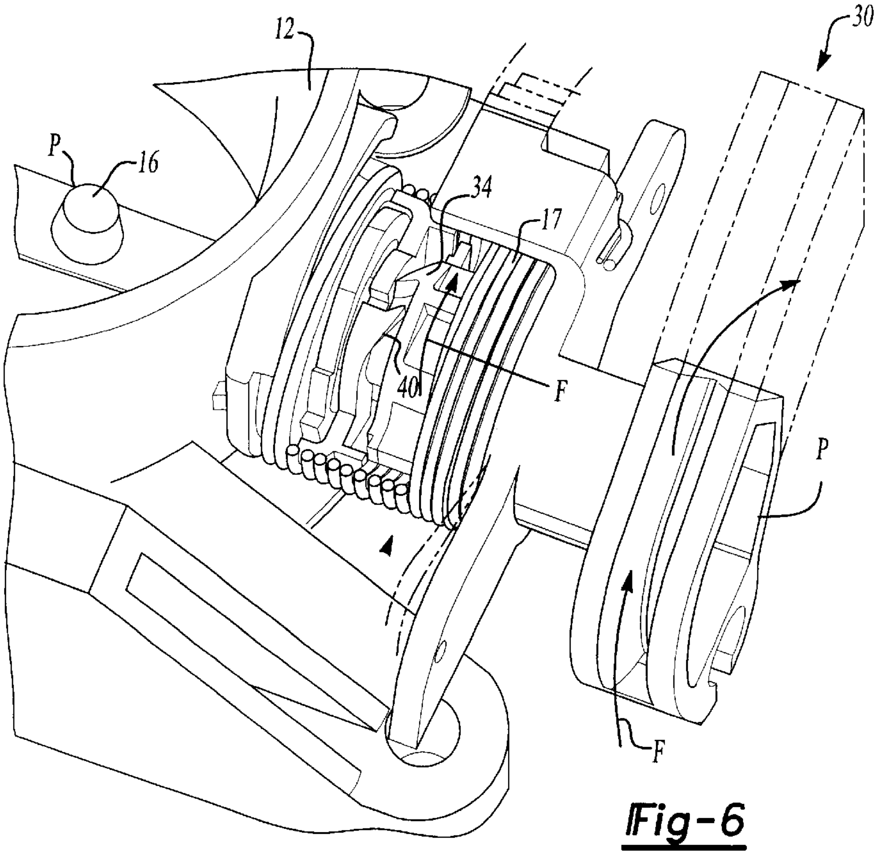
FIG. 6 is an assembled view, partially cut-away, of the throttle shaft subassembly according to the present invention in an idle position and a multiple of operative positions in phantom.

Referring to FIG. 6, it is preferred that when the shaft subassembly 30 is mounted to the throttle body 12, the shaft 16 is located in an idle position P. Idle position P is a position in which the disc 14 (FIG. 1) is in a substantially closed position. Thus, when the disc 14 is rotated about the axis of rotation 26 to a more opened position (in the direction of arrow F) the shaft lock lip 36 is rotated further away from the cap lock lip 42. Accordingly, cap ramped surfaces 40 and shaft ramped surfaces 34 do not interfere with normal throttle shaft operation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A throttle assembly comprising:

a throttle body having an airflow passage defining a longitudinal axis and a bore intersecting said airflow passage and defining an axis of rotation that is transverse to said longitudinal axis;

a throttle shaft member having a body portion for receiving rotational input to move between an idle position and various operable positions, and a shaft portion extending outwardly from said body portion along said axis of rotation and receivable within said bore;

a spring securable to said throttle shaft member to return said body portion to said idle position once the input is removed; and a cap retainer securable to said spring and having a lock member engageable with said body portion to selectively lock said cap retainer to said throttle shaft member.

2. An assembly according to claim 1 wherein said body portion includes a set of shaft ramped surfaces, each of said shaft ramped surfaces extending from said body portion and wherein said lock member includes a set of cap ramped surfaces, said shaft ramped surfaces engageable with said cap ramped surfaces.

3. An assembly according to claim 2 wherein each of said set of shaft ramped surfaces includes a shaft lock lip, each of said shaft lock lips extending from said body portion and wherein each of said cap ramp surfaces includes a cap lock lip, said shaft lock lips engageable with said cap lock lips when said cap retainer is rotated relative to said body portion and said cap lock lips are engaged with said shaft lock lips.

4. An assembly according to claim 1, wherein said spring is placed in a state of tension when said cap retainer is rotated relative to said body portion and said lock member is engaged with said body portion.

5. An assembly according to claim 1 wherein said cap retainer includes a set of fingers extending outwardly from said cap retainer opposite said lock member for interacting with said throttle body to at least partially unload said spring and selectively unlock said cap retainer from said throttle shaft member.

6. An assembly according to claim 5 wherein each of said set of fingers includes a lock hook engageable with a corresponding engagement recesses located in said throttle body.

7. An assembly according to claim 6 wherein said engagement recesses are located in a boss surrounding said bore.

8. An assembly according to claim 6 wherein said engagement recesses include a ramped surface which are interactable with said set of fingers rotate said cap retainer relative to said body portion as said shaft is inserted into said bore along said axis of rotation.

9. An assembly according to claim 1 wherein said cap retainer includes a set of fingers extending outwardly from said cap retainer opposite said lock member for interacting with a boss surrounding said bore, said boss including a set of engagement recesses to receive said set of fingers to rotate said cap retainer relative to said body portion as said shaft is inserted into said bore along said axis of rotation and to at least partial unload said spring and selectively unlock said cap retainer from said throttle shaft member.

10. A method of assembling a throttle shaft to a throttle body comprising the steps of:

(a) securing a resilient member to the throttle shaft with a retainer;

(b) locking the retainer to the shaft to form a throttle shaft subassembly;

(c) inserting a shaft portion of the throttle shaft subassembly into the throttle body;

(d) rotating the retainer with respect to the throttle body to at least partially unload the resilient member; and (c) unlocking the retainer from the shaft.

11. The method according to claim 10 wherein step (a) includes securing one attachment portion of the resilient member to the throttle shaft and another attachment portion of the resilient member to the retainer.

12. The method according to claim 10 wherein step (b) includes providing a first locking member on the retainer and a second locking member on the throttle shaft subassembly; tensioning the resilient member; and engaging said first locking member with said second locking member.

13. The method according to claim 12 wherein step (e) includes disengaging the first locking member from the second locking member to permit the throttle shaft to rotate relative to the throttle body.

14. The method according to claim 10 wherein step (c) includes linearly inserting a portion of the throttle shaft subassembly through a bore formed in the throttle body.

15. The method according to claim 14 including the step of providing the bore with a boss substantially surrounding the bore and extending outwardly from the throttle body that defines an outer diameter having an enhancement recess and wherein step (d) includes providing the retainer with a plurality of fingers extending outwardly from the retainer and rotating the retainer with respect to the throttle body such that the fingers engage the engagement recesses to at least partially unload the resilient member.

16. A throttle shaft assembly comprising:

a body portion;

a shaft portion extending outwardly from said body to define a longitudinal axis;

a retainer having a locking member for engaging a locking surface on said body portion to lock said retainer to said body portion;

a resilient member having a first attachment portion secured to said body and a second attachment portion secured to said retainer wherein said retainer is rotated about said longitudinal axis to engage said locking member with said locking surface to retain said resilient member in a state of tension and prevent relative motion between said resilient member and said body when said retainer is locked to said body portion.

17. An assembly according to claim 16 wherein said resilient member comprises a coil spring coiled about said shaft portion with said first attachment portion being a first spring end and said second attachment portion being a second spring end.

18. An assembly according to claim 17 wherein said body has an outwardly extending flange and wherein said retainer includes a slot extending partially about the circumference of said retainer, said first spring end securing said spring to said flange and said second spring end being inserted through said slot to secure said spring to said retainer.

19. An assembly according to claim 17 wherein said locking member includes a first set of ramped members extending from said retainer and said locking surface includes a second set of ramped members extending from said body and spaced circumferentially about said shaft portion, said first set of ramped members engageable with said second set of ramped surfaces as said retainer is rotated relative to said shaft portion.

* * * * *